(12) United States Patent
Schoenly

(10) Patent No.: US 9,963,154 B2
(45) Date of Patent: May 8, 2018

(54) VEHICLE HANDLING SYSTEM AND METHOD

(71) Applicant: General Electric Company, Schenectady, NY (US)

(72) Inventor: Scott Alan Schoenly, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/159,893

(22) Filed: May 20, 2016

(65) Prior Publication Data

US 2017/0334461 A1 Nov. 23, 2017

(51) Int. Cl.
| | |
|---|---|
| *B61C 17/12* | (2006.01) |
| *B61L 3/16* | (2006.01) |
| *B60L 15/20* | (2006.01) |
| *B61L 3/00* | (2006.01) |

(52) U.S. Cl.
CPC .......... *B61C 17/12* (2013.01); *B60L 15/2045* (2013.01); *B61L 3/16* (2013.01); *B61L 3/006* (2013.01); *B61L 2205/04* (2013.01)

(58) Field of Classification Search
None
See application file for complete search history.

(56) References Cited

U.S. PATENT DOCUMENTS

| | | | |
|---|---|---|---|
| 9,037,323 B2 | 5/2015 | Kumar et al. | |
| 9,193,364 B2 | 11/2015 | Kumar et al. | |
| 2008/0128562 A1 | 6/2008 | Kumar et al. | |
| 2008/0269967 A1* | 10/2008 | Kumar | B61L 27/0027 701/20 |
| 2014/0343835 A1* | 11/2014 | Cooper | B61L 23/00 701/300 |
| 2015/0060608 A1* | 3/2015 | Carlson | B61L 3/125 246/122 R |

FOREIGN PATENT DOCUMENTS

KR 20070005972 A * 1/2007 .............. B60L 15/40

OTHER PUBLICATIONS

Kun, KR20070005972 A, Specification, EPO translation dated May 18, 2017.*

* cited by examiner

*Primary Examiner* — Kevin P Mahne
(74) *Attorney, Agent, or Firm* — GE Global Patent Operation; John A. Kramer

(57) ABSTRACT

A method and system include a vehicle system including a plurality of vehicles. The vehicle system is configured to travel along a route. A plurality of location determination devices are onboard the vehicle system. Each of the plurality of location determination devices is configured to output position data regarding a location of at least one of the plurality of vehicles. A handling unit is in communication with the plurality of location determination devices. The handling unit is configured to receive the position data from the plurality of location determination devices and control separation distances between the plurality of vehicles based on the position data.

22 Claims, 4 Drawing Sheets

VEHICLE HANDLING SYSTEM AND METHOD

TECHNICAL FIELD

Embodiments of the subject matter disclosed herein relate to vehicle handling systems and methods.

BACKGROUND

Some known vehicle systems include multiple vehicles connected together so that the vehicles can travel together. Such vehicle systems can be referred to as consists. Some rail vehicle systems can include multiple consists that each includes locomotives (or other powered rail vehicles) providing propulsive force.

Certain vehicle systems such as rail vehicle systems (for example, trains) include numerous cars that are connected together via couplers. As can be appreciated, trains often include a large number of cars, including powered locomotives and unpowered cars. A handling system is used to control motion of the various cars along a track, for example.

A train handling system is configured to control all parts of a train, including front, middle, and rear sections. While the separate components of the train are connected together, a variable distance exists between the components due to the couplers. For example, as the train moves along a track, the couplers between cars may stretch and contract due to springs and cushioning devices that act as shock absorbers. Accordingly, slack may exist between various components of a train. The resulting slack may lead to run-ins or run-outs in relation to the components of the train. In extreme cases, run-ins or runouts may cause components of the train to disconnect or even derail.

Slack occurs when the rear section of a train stretches or otherwise extends away from a front section. Consequently, a possibility of a run-in exists in that the rear section of the train may accelerate to a speed faster than the front section, which may cause a collision between cars of the train. Conversely, when the rear section of the train moves closer to the front section such that cars of the train are bunched together, a possibility of a run-out exists in that the front section of the train may accelerate to a speed faster than the rear section. During an extreme run-out, a whipping action may cause train cars to break apart from one another.

BRIEF DESCRIPTION

A need exists for a vehicle handling system and method that efficiently controls relative distances between components of a vehicle system. A need exists for a vehicle handling system and method that reduces a likelihood of a run-in or a run-out.

With those needs in mind, certain embodiments of the present disclosure provide a system that may include a vehicle system including a plurality of vehicles. The vehicle system is configured to travel along a route. A plurality of location determination devices are onboard the vehicle system. Each of the plurality of location determination devices is configured to output position data regarding a location of at least one of the plurality of vehicles. A handling unit is in communication with the plurality of location determination devices. The handling unit is configured to receive the position data from the plurality of location determination devices and control separation distances between the plurality of vehicles based on the position data.

A first one of the plurality of location determination devices may be onboard a first one of the plurality of vehicles, and a second one of the plurality location determination devices may be onboard a second one of the plurality of vehicles. In at least one embodiment, a respective one of the plurality of location determination devices may be onboard a respective one of each of the plurality of vehicles.

At least one of the plurality of location determination devices may include a global positioning system (GPS) device. In at least one other embodiment, at least one of the plurality of location determination devices may include a radio frequency identification (RFI) device.

At least one of the plurality of location determination devices may be mounted to at least a portion of at least one of the plurality of vehicles. At least one of the plurality of location determination devices may be secured to a remote device that is onboard at least one of the plurality of vehicles.

In at least one embodiment, the handling unit is onboard at least one of the plurality of vehicles. In at least one other embodiment, the handling unit is remotely located from the vehicle system.

The system may also include a route guidance unit in communication with the handling unit. The handling unit is configured to adjust separation distances between the plurality of vehicles based on features of the route as determined by the route guidance unit.

The handling unit may be configured to bunch at least two of the plurality of vehicles as the vehicle system travels through a curved portion of the route.

The handling unit may be configured to maintain each of the separation distances within a predetermined safe separation range. The predetermined safe separation range may be between a lower safe separation distance threshold and an upper safe separation distance threshold.

Certain embodiments of the present disclosure provide a method that may include operating a vehicle system including a plurality of vehicles along a route, receiving (by a handling unit) position data regarding the plurality of vehicles from a plurality of location determination devices onboard the vehicle system, and controlling (by the handling unit) separation distances between the plurality of vehicles based on the position data.

The method may include positioning a first one of the plurality of location determination devices onboard a first one of the plurality of vehicles, and positioning a second one of the plurality location determination devices onboard a second one of the plurality of vehicles. The method may include positioning a respective one of the plurality of location determination devices onboard a respective one of each of the plurality of vehicles.

The method may include mounting at least one of the plurality of location determination devices on at least a portion of at least one of the plurality of vehicles. The method may include securing at least one of the plurality of location determination devices to a remote device that is onboard at least one of the plurality of vehicles.

In at least one embodiment, the method may include disposing the handling unit onboard at least one of the plurality of vehicles. In at least one other embodiment, the method may include remotely locating the handling unit from the vehicle system.

The method may include adjusting, with the handling unit, separation distances between the plurality of vehicles based on features of the route as determined by a route guidance unit that is in communication with the handling unit.

The method may include using the handling unit to bunch at least two of the plurality of vehicles as the vehicle system travels through a curved portion of the route.

The method may include using the handling unit to maintain each of the separation distances within a predetermined safe separation range. The predetermined safe separation range may be between a lower safe separation distance threshold and an upper safe separation distance threshold.

Certain embodiments of the present disclosure provide a system that includes a vehicle system including a plurality of vehicles. The vehicle system is configured to travel along a route. A handling unit is configured to bunch at least two of the plurality of vehicles as the vehicle system travels through a curved portion of the route.

Certain embodiments of the present disclosure provide a method that includes operating a vehicle system including a plurality of vehicles along a route, and using a handling unit to bunch at least two of the plurality of vehicles as the vehicle system travels through a curved portion of the route.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
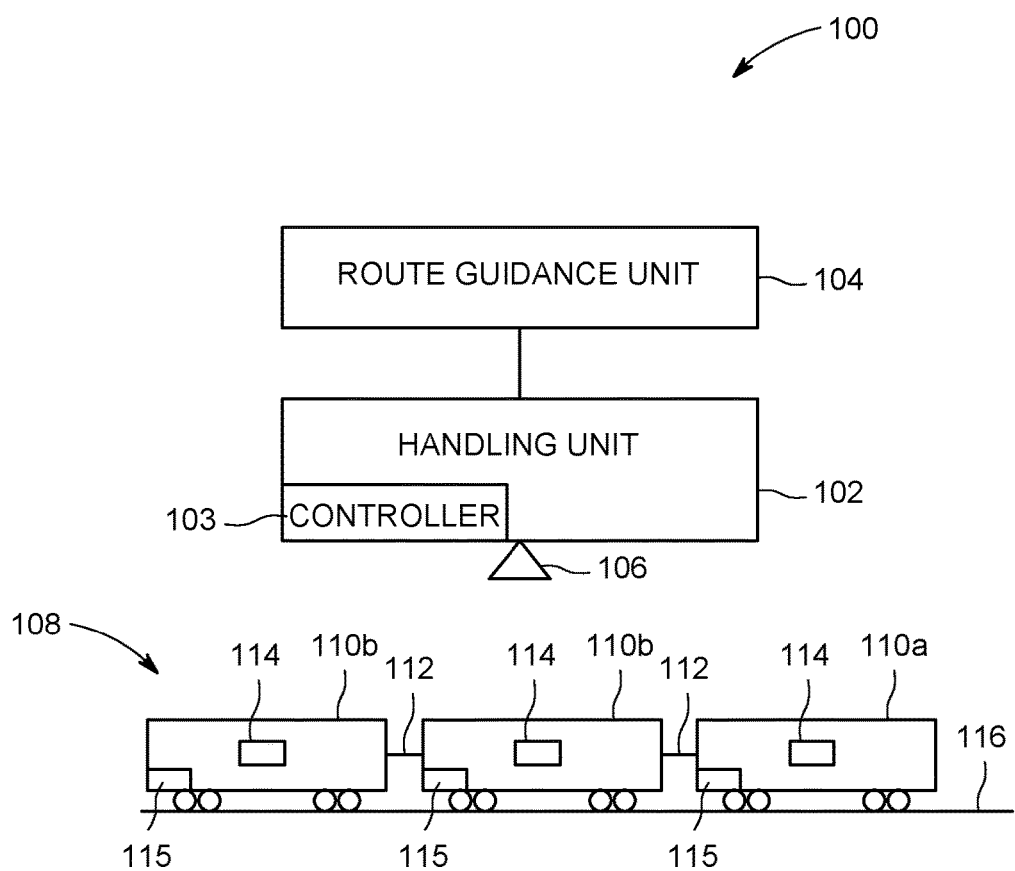
FIG. 1 illustrates a simplified schematic diagram of a vehicle handling system, according to an embodiment of the present disclosure.

Embodiments of the present disclosure provide a vehicle handling system and method that is configured to control motion of a vehicle system through various features along a route, such as hills, curves, and the like. Embodiments of the present disclosure provide systems and methods that increase vehicle safety, decrease maintenance time and costs, and ultimately conserve monetary resources of a vehicle operator.

Certain embodiments of the present disclosure provide a system including a vehicle system that includes a plurality of vehicles having traction systems. The vehicle system is configured to travel along a route. A handling unit includes a communication interface and a controller. The communication interface is configured to receive sensor information from plural sensors onboard the vehicle system. The sensor information is indicative of one or more operational conditions of the vehicle system. The controller is configured to generate control signals, based at least in part on the sensor information, for communication by the communication interface to the traction systems of the plurality of vehicles. Each of the traction systems includes at least one of electric motors, air brakes, or mechanical brakes. The control signals are configured to control the traction systems to cause bunching of at least two of the plurality of vehicles as the vehicle system travels through a curved portion of the route where the at least two of the plurality of vehicles would not be bunched, or bunched to the same degree, in the absence of the control signals.

Certain embodiments of the present disclosure provide a vehicle handling system and method that may receive vehicle position data from locations within a vehicle system and make handling decisions based upon the received position data. The position data may be received from one or more location determination devices, such as global positioning system (GPS) devices. Alternatively, the location determination devices may include radio frequency identification (RFI) devices, modified distributed power systems, modified end of train systems, and/or the like. Each location determination device may be mounted on a component of the vehicle system, such as a train car. In at least one other embodiment, the location determination devices may be remote devices that are stationed onboard portions of the vehicle.

A handling unit may be in communication with each of the location determination devices. The handling unit receives the position data from each of the location determination devices and controls operation of the vehicle accordingly. For example, the handling unit may control throttle and braking of a lead consist and remote consist(s) in order to reduce the amount of slack and buff forces in the vehicle system. In at least one embodiment, the length of the vehicle system is known (for example, stored in memory) by the handling unit. For example, the length of the vehicle system may be output to the handling unit through cellular, WIFI, or other communication paths such as an energy management system.

The handling unit may determine the length of the vehicle system based on the number and types of vehicles within the vehicle system. In at least one other embodiment, the length of the vehicle system may be determined through a stretch test. In a stretch test, a first end of the vehicle system may be anchored, while the opposite second end is propelled in a direction away from the first end. During such movement, distances between location determination devices onboard the vehicle system are calculated (such as through GPS coordinates) until a maximum safe distance is achieved. The maximum safe distance is a predetermined full extension of the vehicle system that does not dislodge portions of the vehicle system from one another. Optionally, two or more vehicles can move away from each other instead of one being anchored.

In at least one other embodiment, the length of the vehicle system may be determined through a bunch test. In a bunch test, a first end of the vehicle system is anchored, while the opposite second end is propelled toward the first end. During such movement, distances between location determination devices onboard the vehicle system are calculated (such as through GPS coordinates) until a minimum safe distance is achieved. The minimum safe distance is a predetermined full compression of the vehicle system that does not derail portions of the vehicle system from one another. Optionally, two more vehicles can move towards one another, instead of one being anchored.

In at least one other embodiment, the length of the vehicle system may be determined through an effort test. In an effort test, all or multiple portions of the vehicle system are propelled at known tractive efforts to determine which effort level from each propulsion-generating vehicle causes the vehicle system to bunch and stretch. The results of an effort test may be used to determined individual vehicle system capabilities to move cars within a specific train or system.

In at least one embodiment, the location determination devices may be RFI devices that are used to provide the position data between components of the vehicle system. As the RFI devices pass an RFI reader (such as positioned along a route), the RFI devices and/or the RFI reader(s) output the position data to the handling unit.

Certain embodiments of the present disclosure provide systems and method that may bunch a vehicle system while it moves through curves in order to reduce rail and wheel wear while reducing fuel consumption by reducing friction due to string-lining. By bunching components of a train through curves, components of the train (such as individual cars) push to an outside rail, thereby equalizing friction along the inside and outside rails. Accordingly, the systems and methods reduce maintenance costs (as portions of the cars do not unevenly wear), and reduce fuel consumption.

A technical effect of embodiments of the present disclosure is that they prevent, minimize, or otherwise reduce vehicle component breaks and derailments (such as due to run-ins). Another technical effect of embodiments of the present disclosure is that they reduce maintenance and fuel costs by reducing vehicle breaks and derailments.

FIG. 1 illustrates a simplified schematic diagram of a vehicle handling system 100, according to an embodiment of the present disclosure. The vehicle handling system 100 may include a handling unit 102 that may be in communication with a route guidance unit 104, such as through one or more wired or wireless connections. The handling unit 102 is coupled to a communication interface, such as communication device 106 (for example, a transceiver, antenna, and/or the like).

A vehicle system 108 includes a plurality of vehicles 110. The vehicle system 108 may include more or less vehicles 110 than shown. The vehicle system 108 may be a train, for example, including a powered vehicle 110a (such as a locomotive and/or consist including multiple locomotives) that provide propulsive force, and a plurality of unpowered vehicles 110b, such as freight cars, passenger cars, and/or the like. Adjacent vehicles 110a, 110b are connected together through one or more couplers 112. Alternatively, the vehicle system 108 may include a plurality of mechanically, electronically, and/or communicatively connected automobiles, trucks, watercraft, and/or the like.

A location sensor, such as a location determination device 114, may be onboard each of the vehicles 110a and 110b. Optionally, multiple location determination devices 114 may be onboard at least one of the vehicles 110a and 110b. The location determination devices 114 may be mounted to a portion of each of the vehicles 110a and 110b. Optionally, the location determination devices 114 may be separate and distinct remote devices that are positioned onboard the vehicles 110a and 110b. For example individuals aboard the vehicle system 108 may carry the location determination devices 114. The location determination devices 114 may be GPS units, RFI units, and/or the like. Each location determination device 114 is configured to detect a position thereof (and therefore the vehicle 110a or 110b where the particular location determination device 114 is located), and output position data that indicates the position of the location determination device 114.

Optionally, instead of a location determination device 114 being onboard each of the vehicles 110a and 110b, a location determination device 114 may be onboard one or more vehicles within a section of vehicles. For example, the vehicle system 108 may include a first plurality of vehicles within a front section, a second plurality of vehicles within a middle section, and a third plurality of vehicles within a rear section.

The handling unit 102 and the route guidance unit 104 may be onboard one of the vehicles 110a or 110b. For example, the handling unit 102 and the route guidance unit 104 may be onboard the vehicle 110a. Alternatively, the handling unit 102 and the route guidance unit 104 may be at a location that is remote, separate, and distinct from the vehicle system 108. For example, the handling unit 102 and the route guidance unit 104 may be located at a central monitoring station that is in communication with the vehicle system 108.

In operation, the vehicle system 108 travels along a route 116. The route 116 may be defined by railroad tracks, for example. In at least one other embodiment, the route 116 may be defined by one or more roads, physical or virtual paths, and/or the like.

The route guidance unit 104 directs the vehicle system 108 along the route. The route guidance unit 104 may include one or more memories that store information about the route 116, such as valleys, hills, curves, stops, and/or the like. The route guidance unit 104 may be configured to direct tractive and braking effort of the vehicle system 108. For example, the route guidance unit 104 may be configured to direct the vehicle system 108 to reduce speed, increase speed, and/or the like at various portions along the route 116.

The handling unit 102 is in communication with each of the location determination devices 114 of the vehicles 110a and 110b. The handling unit 102 receives position data from each of the location determination devices 114. As such, the handling unit 102 determines the position of each of the vehicles 110a and 110b relative to one another through the position data received from the location determination devices 114. Accordingly, the handling unit 102 determines whether distances between the vehicles 110a and 110b are increasing or decreasing.

If, for example, the distance between the vehicles 110a and 110b is increasing, the handling unit 102 may reduce the speed of the vehicle 110a (such as through reduced power and/or braking) and/or increase the speed of the vehicle 110b (such as through controlled brake application, for example) so that the distance between the vehicle 110a and 110b returns to a predetermined desired safe distance or range. The predetermined desired safe distance or range may be a predetermined distance or range that reduces a likelihood of a run-in or a run-out.

If, on the other hand, the distance between the vehicles 110a and 110b is decreasing, the handling unit 102 may increase the speed of the vehicle 110 (such as through increased power and/or reduced brake application) and/or decrease the speed of the vehicle 110b (such as through controlled brake application) so that the distance between the vehicle 110a and 110b returns to the predetermined desired safe distance or range.

The handling unit 102 may be in communication with the route guidance unit 104 to control separation of the vehicles 110a and 110b based on features of the route 116. For example, if the vehicle system 108 is approaching a valley along the route 116 (as determined by the route guidance unit 104), the handling unit 102 may ensure that the separation distance between the vehicle 110a and 110b is reduced, as the downward motion of the vehicle system 108 into the valley may increase the speed of the trailing vehicle 110a (which may otherwise lead to adjacent vehicles 110b moving into each other). As another example, the trailing section or vehicle 110b may be pulling away from the rest of the vehicle system 108 as the vehicle system 108 approaches a valley. In order to prevent the trailing section or vehicle 110b from slamming into an adjacent section of vehicle 110b, the handling unit 102 detects the relative motion through the location determination devices 114, and slows the motion of the trailing section or vehicle 110a so that the separation distance between the trailing section or vehicle 110a is reduced. The handling unit 102 may direct the trailing section or vehicle 110b to speed up (such as through reduced braking) and/or the adjacent section or vehicle 110a or 110b to slow down to reduce the separation distance therebetween.

The handling unit 102 receives the position data from the location determination devices 114 onboard the vehicles 110a and 110b, and, based on the received position data, tracks relative motion between different sections or segments (such as one or more vehicles 110a and 110b) of the vehicle system 108. The handling unit 102 tracks the relative motion between the vehicles 110a and 110b to prevent run-ins and run-outs with respect to the vehicle system 108. The handling unit 102 receives information from the route guidance unit 104 to determine features of the route 116 and control handling of the vehicle system 100 accordingly.

The handling unit 102 receives the position data from the location determination devices 114 of the vehicles 110a and 110b to determine slack conditions (for example, a separation distance that is below a predetermined safe separation distance threshold) or over-extended conditions (for example, a separation distance that is above a predetermined safe separation distance threshold), and direct the vehicles 110a and 110b to adjust their respective speeds to ensure that the separation distances therebetween are within a safe separation distance and/or range. Accordingly, the vehicle handling system 100 provides a closed loop system in which the handling unit 102 controls handling of the vehicles 110a and 110b based on the position data received from the location determination devices 114.

The handling unit 102 may maintain separation distances between the vehicles 110a and 110b within a predetermined safe separation distance or range. The predetermined safe separation range may be between a lower safe separation distance threshold and an upper safe separation distance threshold, which may be determined by the handing unit 102, another control unit, and/or an operator.

As shown in FIG. 1, the handling unit 102 includes a communication interface (such as the communication device 106), and a controller 103 that operably coupled to the communication device 106. The controller 103 may be a control unit, such as one or more processors, or the like. The communication interface receives sensor information from sensors (such as the location determination devices 114) onboard the vehicle system 108. The sensor information is indicative of one or more operational conditions of the vehicle system 108 (for example, speed, location, directional heading, mass/weight, braking or acceleration status or rate, and the like, of the vehicle system 108 generally and/or of individual vehicles 110 within the vehicle system 108). The controller 103 is configured to generate control signals, based at least in part on the sensor information, for communication by the communication interface 106 to traction systems 115 of the 110a and 110b. Each of the traction systems 115 include at least one of electric motors, air brakes (for example, brakes coupled to a brake pipe that actuate based on an air pressure within the brake pipe), or mechanical brakes (for example, brakes that are actuated by a mechanical linkage and/or a hydraulic/pneumatic line). The control signals are configured to control at least one of the traction systems 115 to cause bunching of at least two of the plurality of vehicles 110a and 110b as the vehicle system 108 travels through a curved portion of a route where at least two of the plurality of vehicles would not be bunched, or bunched to the same degree, in the absence of the control signals.

Figure 2:
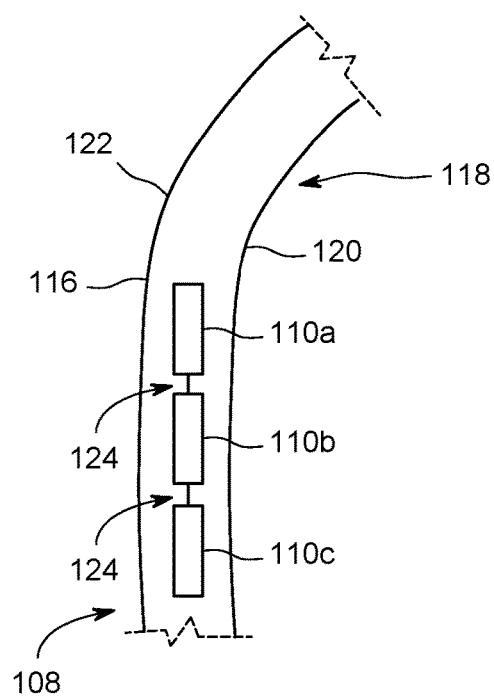
FIG. 2 illustrates a simplified top view of a vehicle system traveling along a route, according to an embodiment of the present disclosure.

FIG. 2 illustrates a simplified top view of the vehicle system 108 traveling along the route 116, according to an embodiment of the present disclosure. As shown, the route 116 may include a curve 118. Referring to FIGS. 1 and 2, the route guidance unit 104 detects the upcoming curve 118 within the route 116. The handling unit 102 is in communication with the route guidance unit 104. The handling unit 102 receives data that indicates an approach of the upcoming curve 118, and may adjust the handling of the vehicle system 108 to efficiently move through the curve 118.

Without the handling unit 102 adjusting motion of the vehicle system 108, as the vehicle system 100 moved through the curve 118, the front section or vehicle 110a would pull the rest of the vehicles 110a, while the rear section or vehicle 110b dragged on an inside rail 120. As such, wheels of the vehicle system 108 on the inside rail 120 may emit a squeaking or screeching sound, and would wear faster than the wheels on the outside rail 122. In order to prevent or otherwise reduce a possibility of squeaking/screeching wheels and wheel wear, the handling unit 102 may bunch the vehicles 110a and 110b together. For example, the handling unit 102 may reduce separation distances between at least two of the vehicle 110a and 110b as they travel over the curve 118. The reduced separation distances may be greater than a lower safe separation distance threshold. By reducing the separation distance(s), the vehicles 110a and 110b exert more force on the outside rail 122, and reduce wheel wear. Bunching the vehicles 110a and 110b together through the curve 118 causes an equilibrium between forces exerted by the vehicles 110a and 110b on the inside and outside rails 120 and 122, respectively, through the curve 118, and causes the rear section (for example, the rear vehicle 110b) of the vehicle system 108 to push the vehicle system 108 through the curve (as opposed to, or with a greater force than, than the front section (for example, the front vehicle 110a) pulling the vehicle system 108 through the curve 118). As such, wheel wear is reduced, and fuel efficiency is increased due to a reduced amount of friction between the wheels of the vehicles 110a and 110b and the inside rail 120.

When two points of the vehicle system 108 are detected by the handling unit 102, through the location determination devices 114 (shown in FIG. 1), and the vehicle system 108 is traveling in a straight line, the handling unit calculates the distance between the detected points, such as through GPS coordinates. If, however, the vehicle system 108 is traversing a curve 118 within the route 116, the route guidance unit 104 provides data regarding the curve 118 to the handling unit 102. That is, the route guidance unit 104 stores data regarding the route 116, including the curve 118, and therefore has knowledge of the curve 118, which is then provided to the handling unit 102. (In at least one embodiment, the route guidance unit 104 may store or otherwise have access to a route database, which includes data regarding the route 116 and other routes.) To explain further, when the vehicle system is traveling along a straight line (i.e., the totality of the vehicle system is co-linear/aligned in a straight direction), the distance between the front and rear of the vehicle system, or any other two points in the vehicle system, can be determined by the handling unit based on the location determination devices, e.g., the shortest distance between the devices corresponds to the distance between the points on the vehicle system along the route. However, when the vehicle is traveling along a curved section of the route, the shortest distance between location determination devices on two points of the vehicle system may not correspond to the distance between those points along the route (i.e., they do not necessarily correspond to the length of the route between the two points). In such an instance, the handling unit may instead determine the distance between two points of the vehicle system along the route (e.g., track distance) based on the locations of the points (e.g., from the location determination devices) as correlated to information from the route database. For example, if a curved route portion corresponds to a semi-circle having a radius of 1 km, points of a vehicle system located at the two end points of the semi-circle will be 2 km apart in a straight line, but will be spaced apart by about 3.14 km along the curve of the route. Thereby, the handling unit may be configured to determine the route distance between two points of the vehicle system based on the locations of the points and the geometry of the route between the two points, as determined from the route database. Alternatively or additionally, the route database may include information of the route distance between various points along the route (e.g., mile markers), which can be used by the handling system for a similar purpose.

Figure 3:
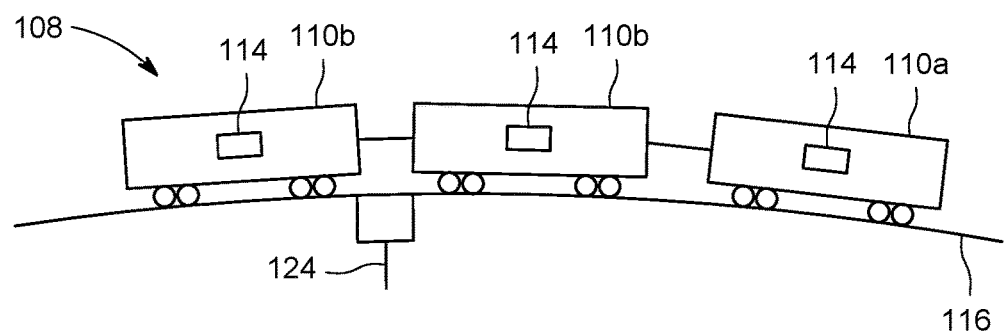
FIG. 3 illustrates a simplified lateral view of a vehicle system traveling along a route, according to an embodiment of the present disclosure.

FIG. 3 illustrates a simplified lateral view of the vehicle system 108 traveling along the route 116, according to an embodiment of the present disclosure. In this embodiment, RFI readers 124 may be stationed along the route 116. The location determination devices 114 may be RFI devices. As the vehicle system 108 travels past the RFI readers 124, the RFI readers 124 detect the presence of the location determination devices 114, and output position data of the location determination devices 114 to the handling unit 102 (shown in FIG. 1). In this manner, the handling unit 102 may receive the position data in the form of RFI signals, which may he output by the RFI readers 124 and/or the location determination devices 114.

As used herein, the term "control unit," "unit" (such as the handling unit 102 or the route guidance unit 104), "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, each of the handling unit 102 and the route guidance unit 104 may be or include one or more processors that are configured to control and/or direct operation of the vehicle system 108.

Each of the handling unit 102 and the route guidance unit 104 is configured to execute a set of instructions that are stored in one or more storage elements (such as one or more memories), in order to process data. For example, each of the handling unit 102 and the route guidance unit 104 may include or be coupled to one or more memories. The storage elements may also store data or other information as desired or needed. The storage elements may be in the form of an information source or a physical memory element within a processing machine.

The set of instructions may include various commands that instruct each of the handling unit 102 and the route guidance unit 104 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the handling unit 102 and the route guidance unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, each of the handling unit 102 and the route guidance unit 104 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
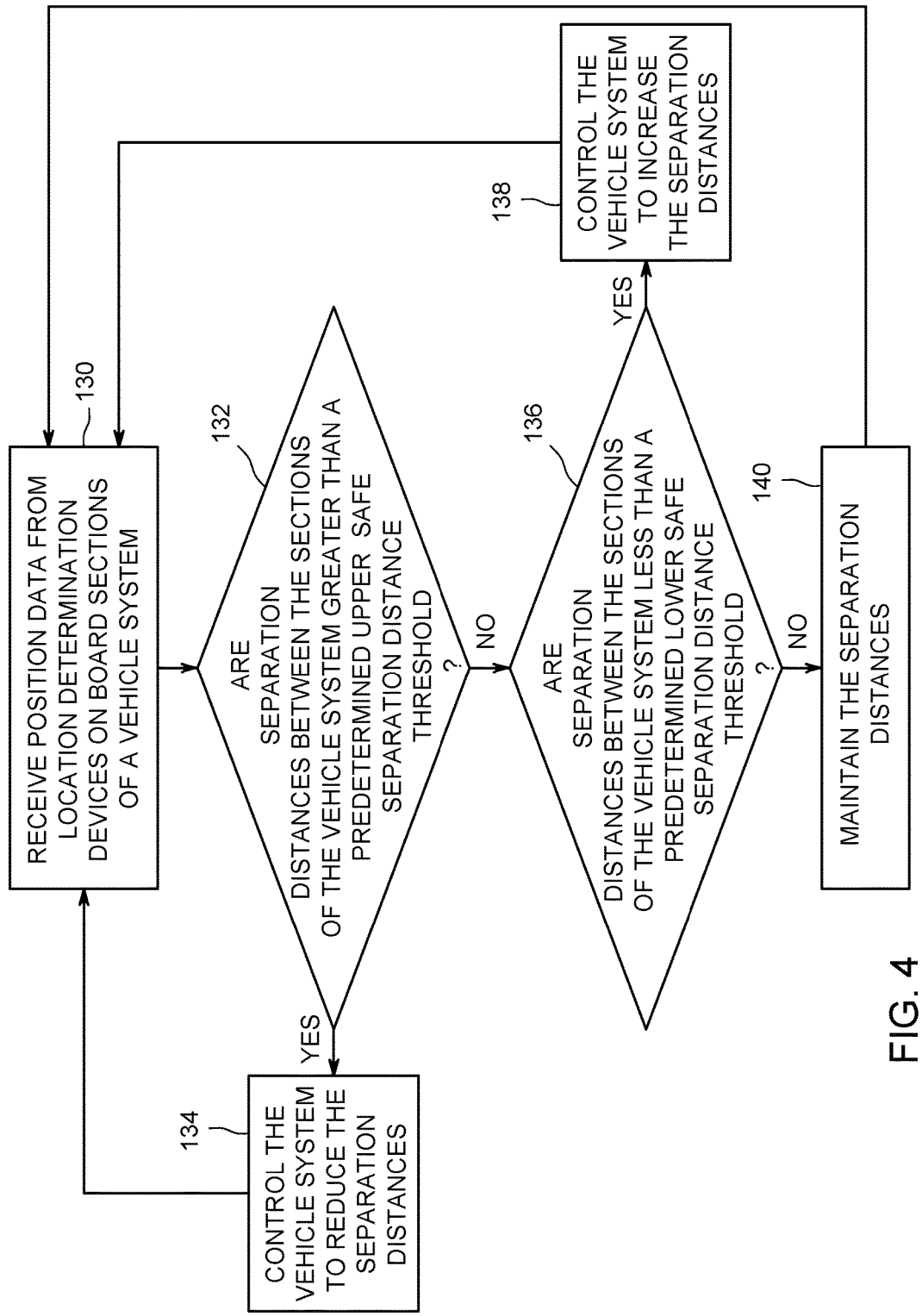
FIG. 4 illustrates a flow chart of a method of controlling a vehicle system, according to an embodiment of the present disclosure.

FIG. 4 illustrates a flow chart of a method of controlling a vehicle system, according to an embodiment of the present disclosure. The handling unit 102 (shown in FIG. 1) may be configured to operate according to the flow chart shown in FIG. 4.

At 130, position data is received from location determination devices on board sections of the vehicle system. For example, the handling unit 102 may receive the position data from the location determination devices. The sections of the vehicle system may be individual vehicles, or groups of vehicles. In at least one embodiment, a location determination device may be onboard each vehicle within a section. In at least one other embodiment, a location determination device may be onboard less than every vehicle within a section. For example, a section of vehicles may include ten vehicles. A location determination device may be onboard only one of the ten vehicles.

At 132, it is determined whether separation distances between the sections of the vehicle system are greater than a predetermined upper safe separation distance threshold. If one or more of the separation distances is greater than the predetermined upper safe separation distance threshold, the method proceeds from 132 to 134, in which the vehicle system is controlled to reduce the separation distance(s). The method then returns to 130 from 134.

If, however, the separation distance(s) is not greater than a predetermined upper safe distance threshold at 132, the method proceeds to 136, in which it is determined whether the separation distances between the sections of the vehicle system are less than a predetermined lower safe separation distance threshold. If one or more of the separation distances is less than the predetermined lower safe separation distance threshold, the method proceeds from 136 to 138, in which the vehicle system is controlled to increase the separation distance(s).

If, however, the separation distance(s) is not less than a predetermined lower safe distance threshold at 136, the method proceeds from 136 to 140, in which the separation distances are maintained. The method then returns to 130 from 140.

As shown, 132 may occur before 136. Optionally, 132 may occur after 136. In at least one other embodiment, 132 and 136 may occur at or approximately the same time.

As described, embodiments of the present disclosure provide vehicle handling systems and methods that control motion of a vehicle system through various features along a route, such as hills, curves, and the like. Embodiments of the present disclosure provide systems and methods that increase vehicle safety, decrease maintenance time and costs, and ultimately conserve monetary resources of a vehicle operator.

Certain embodiments of the present disclosure provide a system including a vehicle system that includes a plurality of vehicles having traction systems. The vehicle system is configured to travel along a route. A handling unit includes a communication interface and a controller. The communication interface is configured to receive sensor information from plural sensors onboard the vehicle system. The sensor information is indicative of one or more operational conditions of the vehicle system. The controller is configured to generate control signals, based at least in part on the sensor information, for communication by the communication interface to the traction systems of the plurality of vehicles. Each of the traction systems includes at least one of electric motors, air brakes, or mechanical brakes. The control signals are configured to control the traction systems to cause bunching of at least two of the plurality of vehicles as the vehicle system travels through a curved portion of the route where the at least two of the plurality of vehicles would not be bunched, or bunched to the same degree, in the absence of the control signals.

Certain embodiments of the present disclosure provide a vehicle handling system and method that may receive vehicle position data from locations on or within a vehicle system and make handling decisions and control the vehicle system based upon the received position data. The position data may be gathered from one or more location determination devices, such as global positioning system (GPS) devices. Alternatively, the location determination devices may include radio frequency identification (RFI) devices, modified distributed power systems, modified end of train systems, or the like. Each location determination device may be mounted on or in a component of the vehicle system, such as a train car. In at least one other embodiment, the location determination devices may be remote devices that are stationed onboard components of the vehicle.

Certain embodiments of the present disclosure provide systems and method that may bunch a vehicle system while it moves through curves in order to reduce rail and wheel wear while reducing fuel consumption by reducing wheel friction. By bunching components of a train through curves, components of the train (such as individual cars) push to an outside rail, thereby equalizing friction along the inside and outside rails. Accordingly, the systems and methods reduce maintenance costs (as portions of the cars do not unevenly wear), and reduce fuel consumption.

Embodiments of the present disclosure provide systems and method that prevent, minimize, or otherwise reduce vehicle component breaks and derailments (such as due to run-ins). Embodiments of the present disclosure reduce maintenance and fuel costs by reducing vehicle breaks and derailments.

Figure 5:
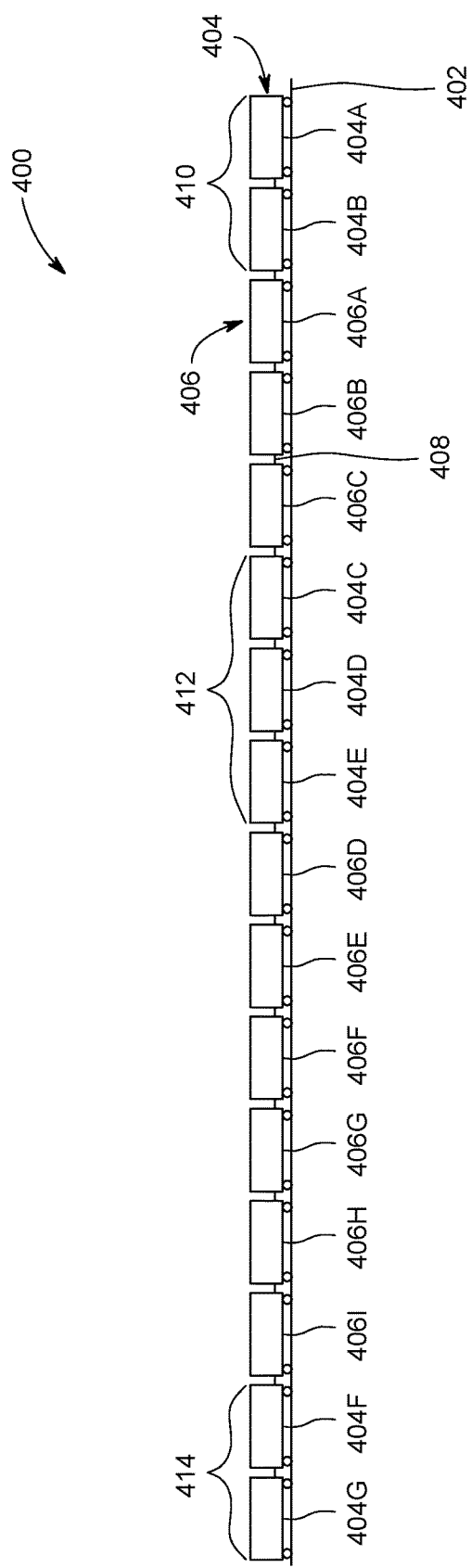
FIG. 5 illustrates a schematic diagram of one example of a vehicle system traveling along a route, according to an embodiment of the present disclosure.

FIG. 5 illustrates a schematic diagram of one example of a vehicle system 400 traveling along a route 402, according to an embodiment of the present disclosure. The handling unit 102 and the route guidance unit 104 (shown in FIG. 1) may be used to control operation and handling of the vehicle system 400.

The vehicle system 100 includes several vehicles 404, 406 operably coupled with each other. A location determination device 114 (shown in FIG. 1, for example) may be onboard each of the vehicles 404 and 406. Optionally, a location determination device 114 may be onboard less than all of the vehicles 404 and 406.

The vehicles 404, 406 may be mechanically coupled with each other, such as by couplers 408. Alternatively, the vehicles 404, 406 may be coupled with each other without being mechanically coupled with each other. For example, the vehicles 404, 406 may be aerodynamically or fluidly coupled with each other when the vehicles 404, 406 travel sufficiently close to each other that the drag force imparted on one or more of the vehicles (e.g., from air, wind, water, or the like) is reduced on one or more other vehicles. Marine vessels may be fluidly or aerodynamically coupled when the vessels travel close enough together such that the drag on one or more vessels from the water is reduced relative to the marine vessels traveling farther apart. Automobiles (e.g., trucks) may be fluidly or aerodynamically coupled when the automobiles travel close enough together such that the drag on one or more automobiles is reduced relative to the automobiles traveling farther apart. Two vehicles 404 and/or 406 may be directly connected with each other when no other vehicle 404 or 406 is disposed between the directly connected vehicles 404 and/or 406. Two vehicles 404 and/or 406 may be indirectly connected or interconnected with each other when one or more other vehicles 404 and/or 406 are disposed between and connected with the interconnected vehicles 404 and/or 406.

The vehicles 404 (e.g., vehicles 104A-G) represent propulsion-generating vehicles, such as vehicles capable of generating propulsive force to propel the vehicle system 400 along the route 402. Examples of propulsion-generating vehicles 406 include locomotives, other off-highway vehicles (e.g., vehicles that are not designed for or permitted to travel on public roadways), automobiles (e.g., vehicles that are designed for traveling on public roadways), marine vessels, and the like. In one embodiment, the vehicles 404 represent locomotives and the vehicles 406 represent rail cars. The vehicles 404 may be fuel-powered vehicles (e.g., engines that consume fuel are used to generate propulsive force by creating electric current to power motors or to rotate axles and wheels), electric-powered vehicles (e.g., onboard or off board sources of electric current are used to power motors to generate propulsive force), and/or hybrid powered vehicles (e.g., vehicles that are powered by fuel-consuming engines and other sources of electric current). The vehicles 406 (e.g., vehicles 106A-I) represent non-propulsion-generating vehicles, such as rail cars or other units that are propelled along the route 402 by the propulsion-generating vehicles 404.

The term "vehicle" as used herein can be defined as a mobile machine that transports at least one of a person, people, or a cargo. For instance, a vehicle can be, but is not limited to being, a rail car, an intermodal container, a locomotive, a marine vessel, mining equipment, construction equipment, an automobile, and the like. A "vehicle system" includes two or more vehicles that are interconnected with each other to travel along a route. For example, a vehicle system can include two or more vehicles that are directly connected to each other (e.g., by a coupler) or that are indirectly connected with each other (e.g., by one or more other vehicles and couplers). A vehicle system can be or include as a consist, such as a rail vehicle consist.

The propulsion-generating vehicles 404 may be arranged in consists 410, 412, 414, as shown in FIG. 5. Each consist 410, 412, 414 may include the propulsion-generating vehicles 404 directly connected with each other in the vehicle system 400. While each consist 410, 412, 414 is shown as including multiple propulsion-generating vehicles 404, one or more of the consists 410, 412, 414 may optionally include a single propulsion-generating vehicle 404.

While the vehicle system 400 is shown in FIG. 5 as a train, alternatively, the vehicle system 400 may represent another vehicle system formed of vehicles other than locomotives (e.g., the propulsion-generating vehicles 404) and railcars (e.g., the non-propulsion generating vehicles 406). For example, the vehicle system 400 may represent several automobiles, marine vessels, off-highway vehicles other than rail vehicles, or the like, joined together to travel along the route 402.

In one embodiment, tractive efforts (e.g., power output, horsepower, speed, and the like) and/or braking efforts of the vehicle system 400 may be controlled to drive the vehicle system 400 along the route 402 from an origin location to a destination location. For example, the handling unit 102 (shown in FIG. 1) may control tractive efforts of the vehicle system 400 based on position data received from the location determination devices 114 (shown in FIG. 1) onboard a plurality of the vehicles 404 and 406. For example, the handling unit 102 may receive the position data from the location determination devices 114 and direct tractive and/or braking of the vehicles 404 and 406 of the vehicle system 400 accordingly. The tractive and/or braking efforts may be automatically controlled such that the tractive and/or braking efforts provided by the vehicles 404, 406 are controlled without operator intervention. Alternatively or additionally, the vehicle system 400 may provide prompts and notices to an operator that direct the operator how to manually control the efforts of the vehicle system 400. For example, the system 400 may provide prompts to an operator to instruct the operator of which operational settings to use at a current time and/or which settings to use at upcoming times when the system 400 arrives at one or more upcoming locations. The operational settings (e.g., settings that control tractive effort, braking effort, etc.) of the propulsion-generating vehicles and/or non-propulsion-generating vehicles may be referred to herein as operational parameters.

Referring to FIGS. 1-5, certain embodiments of the present disclosure provide a system that may include a vehicle system including a plurality of vehicles. The vehicle system is configured to travel along a route. A plurality of location determination devices are onboard the vehicle system. Each of the plurality of location determination devices is configured to output position data regarding a location of at least one of the plurality of vehicles. A handling unit is in communication with the plurality of location determination devices. The handling unit is configured to receive the position data from the plurality of location determination devices and control separation distances between the plurality of vehicles based on the position data.

A first one of the plurality of location determination devices may be onboard a first one of the plurality of vehicles, and a second one of the plurality location determination devices may be onboard a second one of the plurality of vehicles. In at least one embodiment, a respective one of the plurality of location determination devices may be onboard a respective one of each of the plurality of vehicles.

At least one of the plurality of location determination devices may include a global positioning system (GPS) device. In at least one other embodiment, at least one of the plurality of location determination devices may include a radio frequency identification (RFI) device.

At least one of the plurality of location determination devices may be mounted to at least a portion of at least one of the plurality of vehicles. At least one of the plurality of location determination devices may be secured to a remote device that is onboard at least one of the plurality of vehicles.

In at least one embodiment, the handling unit is onboard at least one of the plurality of vehicles. In at least one other embodiment, the handling unit is remotely located from the vehicle system.

The system may also include a route guidance unit in communication with the handling unit. The handling unit is configured to adjust separation distances between the plurality of vehicles based on features of the route as determined by the route guidance unit.

The handling unit may be configured to bunch at least two of the plurality of vehicles as the vehicle system travels through a curved portion of the route.

The handling unit may be configured to maintain each of the separation distances within a predetermined safe separation range. The predetermined safe separation range may be between a lower safe separation distance threshold and an upper safe separation distance threshold.

Certain embodiments of the present disclosure provide a method that may include operating a vehicle system including a plurality of vehicles along a route, receiving, by a handling unit, position data regarding the plurality of vehicles from a plurality of location determination devices onboard the vehicle system, and controlling, by the handling unit, separation distances between the plurality of vehicles based on the position data.

The method may include positioning a first one of the plurality of location determination devices onboard a first one of the plurality of vehicles, and positioning a second one of the plurality location determination devices onboard a second one of the plurality of vehicles. The method may include positioning a respective one of the plurality of location determination devices onboard a respective one of each of the plurality of vehicles.

The method may include mounting at least one of the plurality of location determination devices on at least a portion of at least one of the plurality of vehicles. The method may include securing at least one of the plurality of location determination devices to a remote device that is onboard at least one of the plurality of vehicles.

In at least one embodiment, the method may include disposing the handling unit onboard at least one of the plurality of vehicles. In at least one other embodiment, the method may include remotely locating the handling unit from the vehicle system.

The method may include adjusting, with the handling unit, separation distances between the plurality of vehicles based on features of the route as determined by a route guidance unit that is in communication with the handling unit.

The method may include using the handling unit to bunch at least two of the plurality of vehicles as the vehicle system travels through a curved portion of the route.

The method may include using the handling unit to maintain each of the separation distances within a predetermined safe separation range. The predetermined safe separation range may be between a lower safe separation distance threshold and an upper safe separation distance threshold.

Certain embodiments of the present disclosure provide a system that includes a vehicle system including a plurality of vehicles. The vehicle system is configured to travel along a route. A handling unit is configured to bunch at least two of the plurality of vehicles as the vehicle system travels through a curved portion of the route.

Certain embodiments of the present disclosure provide a method that includes operating a vehicle system including a plurality of vehicles along a route, and using a handling unit to bunch at least two of the plurality of vehicles as the vehicle system travels through a curved portion of the route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:
1. A system comprising:
a communication interface configured to receive sensor information from plural sensors onboard a vehicle system that includes plural vehicles having traction systems, wherein the sensor information is indicative of one or more operational conditions of the vehicle system; and a controller configured to receive the sensor information from the communication interface and to generate a control signal based at least in part on the sensor information, wherein the communication interface is configured to communicate the control signal to the traction systems of the vehicles, wherein the control signal is configured to control the traction systems to increase a force exerted by the vehicles on an outside rail of a route being traveled by the vehicle system by increasing a force generated by at least one of the traction systems located closer to a trailing end of the vehicle system relative to at least one of the traction systems located closer to a leading end of the vehicle system to cause bunching of at least two of the vehicles as the vehicle system travels through a curved portion of the route.

2. The system of claim 1, further comprising location determination devices configured to be disposed onboard the vehicle system, wherein the location determination devices are configured to output position data indicative of a location of at least one of the vehicles, wherein the controller is configured to receive the position data from the location determination devices and to increase the force exerted on the outside rail of the route by controlling separation distances between the vehicles based on the position data.

3. The system of claim 2, wherein the location determination devices are configured to be disposed onboard different vehicles of the vehicles in the vehicle system.

4. The system of claim 2, wherein each of the location determination devices is configured to be disposed onboard a different vehicle of the vehicles in the vehicle system.

5. The system of claim 2, wherein at least one of the location determination devices comprises a global positioning system (GPS) device.

6. The system of claim 2, wherein at least one of the location determination devices comprises a radio frequency identification (RFI) device.

7. The system of claim 2, wherein at least one of the location determination devices is configured to be mounted to at least one of the vehicles.

8. The system of claim 2, wherein at least one of the location determination devices is configured to be secured to a remote device that is onboard at least one of the vehicles.

9. The system of claim 2, wherein the controller is configured to maintain the separation distances within a predetermined safe separation range.

10. The system of claim 1, wherein the controller is configured to be onboard at least one of the vehicles.

11. The system of claim 1, wherein the controller is configured to be remotely located from the vehicle system and to generate the control signal while off-board the vehicle system.

12. The system of claim 1, further comprising a route guidance unit configured to determine one or more features of the route and to communicate the one or more features of the route to the controller, wherein the controller is configured to adjust at least one of the separation distances between the vehicles based on the one or more features of the route determined by the route guidance unit.

13. A method comprising:
determining that a vehicle system having plural vehicles is approaching or entering a curved portion of a route, the vehicles including traction systems that propel the vehicles and the vehicle system; and increasing a force exerted by the vehicles on an outside rail of the route in the curved portion of the route by increasing a force generated by at least one of the traction systems located closer to a trailing end of the vehicle system relative to at least one of the traction systems located closer to a leading end of the vehicle system using a handling unit that generates a control signal to control the traction systems of the vehicles as the vehicle system travels through the curved portion of the route.

14. The method of claim 13, further comprising:
receiving, by the handling unit, position data indicative of locations of the vehicles from location determination devices onboard the vehicle system; and
controlling, by the handling unit, the one or more separation distances between the vehicles based on the position data.

15. The method of claim 13, further comprising maintaining the one or more separation distances within a predetermined safe separation range using the handling unit.

16. The method of claim 13, wherein the control signal is generated by the handling unit that is onboard at least one of the vehicles.

17. The method of claim 13, wherein the control signal is generated by the handling unit that is off-board the vehicle system.

18. The method of claim 13, further comprising adjusting, with the handling unit, the one or more separation distances between the vehicles based on features of the route as determined by a route guidance unit that is in communication with the handling unit.

19. A system comprising:
one or more processors configured to determine a location of a vehicle system formed from two or more vehicles, the one or more processors also configured to determine whether the vehicle system is approaching or entering a curved portion of a route based on the location that is determined, the one or more processors also configured to automatically generate a control signal that increases a tractive force generated by one or more traction systems onboard the vehicles and located closer to a trailing end of the vehicle system relative to a tractive force generated by one or more other traction motors onboard the vehicles and located farther from the trailing end of the vehicle system.

20. The system of claim 19, wherein the one or more processors are configured to generate the control signal to increase a force exerted by the vehicle system on an outside rail of the route in the curved portion of the route.

21. The system of claim 19, wherein the one or more processors are configured to determine a length of the vehicle system by directing at least one of the vehicles to move in a direction away from one or more other vehicles in the vehicle system and determining distances between the vehicles in the vehicle system.

22. The system of claim 19, wherein the one or more processors are configured to determine a length of the vehicle system by directing at least one of the vehicles to move in a direction toward one or more other vehicles in the vehicle system and determining distances between the vehicles in the vehicle system.

* * * * *